United States Patent
McNew (10) Patent No.: US 9,969,267 B2
(45) Date of Patent: May 15, 2018

(54) EGO-VEHICLES, SYSTEMS, AND METHODS FOR MONITORING TARGET OBJECTS

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 16 days.

(21) Appl. No.: 15/196,401

(22) Filed: Jun. 29, 2016

(65) Prior Publication Data

US 2018/0001766 A1 Jan. 4, 2018

(51) Int. Cl.
| | |
|---|---|
| *B60K 35/00* | (2006.01) |
| *B60R 1/00* | (2006.01) |
| *G05D 1/02* | (2006.01) |
| *G01C 21/36* | (2006.01) |
| *G06K 9/00* | (2006.01) |
| *G06T 11/60* | (2006.01) |
| *G01S 13/86* | (2006.01) |

(52) U.S. Cl.
CPC ............. *B60K 35/00* (2013.01); *B60R 1/00* (2013.01); *G01C 21/3647* (2013.01); *G01S 13/865* (2013.01); *G05D 1/0231* (2013.01); *G05D 1/0257* (2013.01); *G06K 9/00798* (2013.01); *G06K 9/00805* (2013.01); *G06T 11/60* (2013.01); *B60R 2300/802* (2013.01)

(58) Field of Classification Search
CPC .................................................... B60K 35/00

USPC .......................................................... 701/65
See application file for complete search history.

(56) References Cited

U.S. PATENT DOCUMENTS

| | | | | |
|---|---|---|---|---|
| 6,529,831 | B1 * | 3/2003 | Smith .................. | G08G 1/0965 340/903 |
| 6,958,707 | B1 * | 10/2005 | Siegel .................... | G08G 1/087 340/435 |
| 8,352,112 | B2 | 1/2013 | Mudalige | |
| 9,495,602 | B2 * | 11/2016 | Okumura ........... | G06K 9/00624 |
| 2002/0198660 | A1 * | 12/2002 | Lutter ................... | A01M 31/00 701/300 |
| 2014/0067250 | A1 * | 3/2014 | Bone ...................... | G08G 1/167 701/301 |

(Continued)

FOREIGN PATENT DOCUMENTS

| | | |
|---|---|---|
| DE | 201011106746 A1 | 1/2013 |
| DE | 102012211509 A1 | 1/2014 |

*Primary Examiner* — Ryan R Yang
(74) *Attorney, Agent, or Firm* — Dinsmore & Shohl LLP (57) ABSTRACT

An ego-vehicle for displaying a behavior of a target object in a spatio-temporal manner may include one or more processors. One or more memory modules are communicatively coupled to the one or more processors. A display is communicatively coupled to the one or more processors. One or more sensors are communicatively coupled to the one or more processors. Machine readable instructions are stored in the one or more memory modules and cause the one or more processors to display on the display an object indicator associated with a position of a target object relative to the ego-vehicle, wherein the object indicator depicts a spatio-temporal patterning indicating the behavior of the target object.

20 Claims, 7 Drawing Sheets

(56) References Cited

U.S. PATENT DOCUMENTS

| | | | |
|---|---|---|---|
| 2014/0249722 A1* | 9/2014 | Hegemann | G08G 1/16 701/41 |
| 2015/0032289 A1 | 1/2015 | Lotz et al. | |
| 2015/0284010 A1* | 10/2015 | Beardsley | B60W 50/10 701/41 |
| 2016/0033963 A1* | 2/2016 | Noh | H04W 4/046 701/2 |
| 2017/0132922 A1* | 5/2017 | Gupta | G08G 1/0962 |

* cited by examiner

EGO-VEHICLES, SYSTEMS, AND METHODS FOR MONITORING TARGET OBJECTS

TECHNICAL FIELD

The present specification generally relates to ego-vehicles, systems, and methods for monitoring objects and, more specifically, to ego-vehicles, systems, and methods for monitoring the spatio-temporal position of a target object in a vicinity of the ego-vehicle.

BACKGROUND

Vehicles exist that are capable of driving either completely autonomously or partially autonomously. Autonomous vehicles often utilize surrounding vehicle speed for path planning, using LiDAR, as an example. However, even when the surrounding vehicle speed is acquired, the current technology does not display it to the driver. Because a driver of an autonomous vehicle will only be checking in visually occasionally, the ability to understand surrounding vehicle speed may be degraded, particularly for far removed vehicles.

Accordingly, a need exists for alternative vehicles and methods for displaying surrounding vehicle speed to a driver of a vehicle in more accessible and intuitive ways. Such displays may be applicable to autonomous and non-autonomous vehicles alike.

SUMMARY

In one embodiment, an ego-vehicle for displaying a behavior of a target object in a spatio-temporal manner may include one or more processors. One or more memory modules are communicatively coupled to the one or more processors. A display is communicatively coupled to the one or more processors. One or more sensors are communicatively coupled to the one or more processors. Machine readable instructions are stored in the one or more memory modules and cause the one or more processors to display on the display an object indicator associated with a position of a target object relative to the ego-vehicle, wherein the object indicator depicts a spatio-temporal patterning indicating a behavior of the target object.

In another embodiment, a system for displaying a behavior of a target object in a spatio-temporal manner relative to the system may include one or more processors. One or more memory modules are communicatively coupled to the one or more processors. A display is communicatively coupled to the one or more processors. One or more sensors are communicatively coupled to the one or more processors. Machine readable instructions are stored in the one or more memory modules and cause the one or more processors to display on the display an object indicator associated with a position of a target object relative to the system, wherein the object indicator depicts a spatio-temporal patterning indicating the behavior of the target object relative to the system.

In yet another embodiment, method of displaying a behavior of a target object in a spatio-temporal manner relative to an ego-vehicle may include detecting, with one or more sensors, a target object in a vicinity of the ego-vehicle. The target object is monitored for a speed, a direction of travel, and a position of the target object relative to the ego-vehicle. One or more processors act to display an object indicator associated with a position of the target object relative to the ego-vehicle on a display. The object indicator depicts a spatio-temporal patterning indicating a behavior of the target object. The spatio-temporal patterning of the object indicator is adjusted on the display to correspond with the behavior of the target object within the vicinity of the ego-vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures generally depict embodiments of an ego-vehicle for monitoring a spatio-temporal position of a target object outside of the ego-vehicle. The ego-vehicle generally comprises one or more processors, one or more memory modules communicatively coupled to the one or more processors, a display communicatively coupled to the one or more processors, and one or more sensors communicatively coupled to the one or more processors. Machine readable instructions stored in the one or more memory modules cause the ego-vehicle to perform at least the following when executed by the one or more processors: detect a target object in a vicinity of the ego-vehicle; monitor the speed and position of the target object; and display an object indicator associated with the target object that indicates the speed of the target object.

It is noted that the present disclosure may be applied to any vehicle. It is contemplated that the ego-vehicle may be an autonomous vehicle or a partially autonomous vehicle. When referring to autonomous or partially autonomous vehicles, it is meant to refer to vehicles having at least one drive mode wherein a human operator is not necessary to guide the vehicle.

Figure 1:
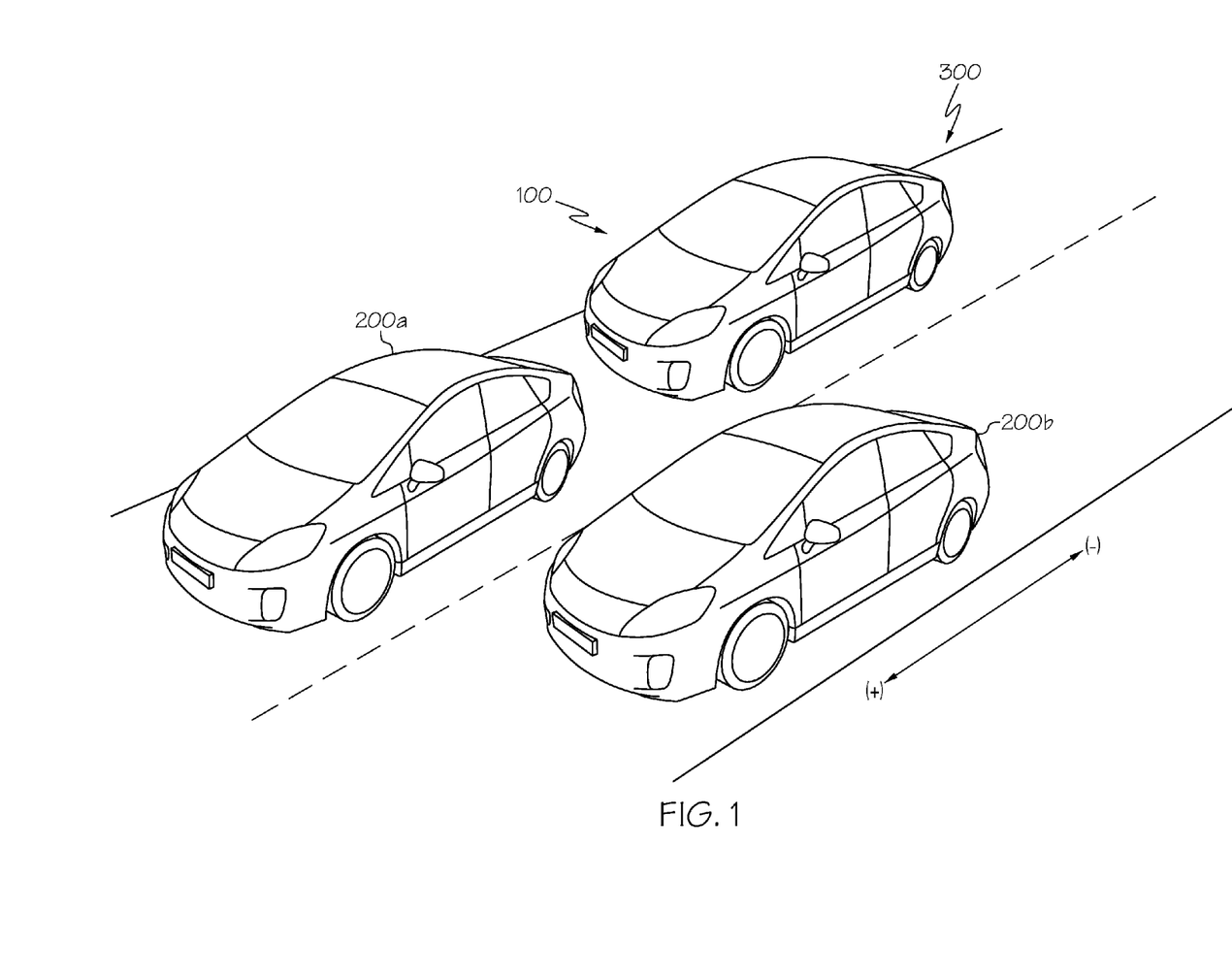
FIG. 1 depicts several vehicles including an ego-vehicle on a road according to one or more embodiments shown and described herein.

Referring now to FIG. 1, an ego-vehicle 100 is depicted on a roadway 300. Target objects 200a and 200b are also shown on the roadway 300 within the vicinity of the ego-vehicle 100. Though the target objects 200a and 200b are shown as other vehicles, it is noted that the target objects 200a and 200b could be other objects including, but not limited to, other vehicles, cyclists, pedestrians, animals, etc. Further, though the target objects 200a, 200b are depicted as going in the same general direction as the ego-vehicle 100, it is noted, that the contents of the present application are applicable to objects traveling in any direction.

Figure 2:
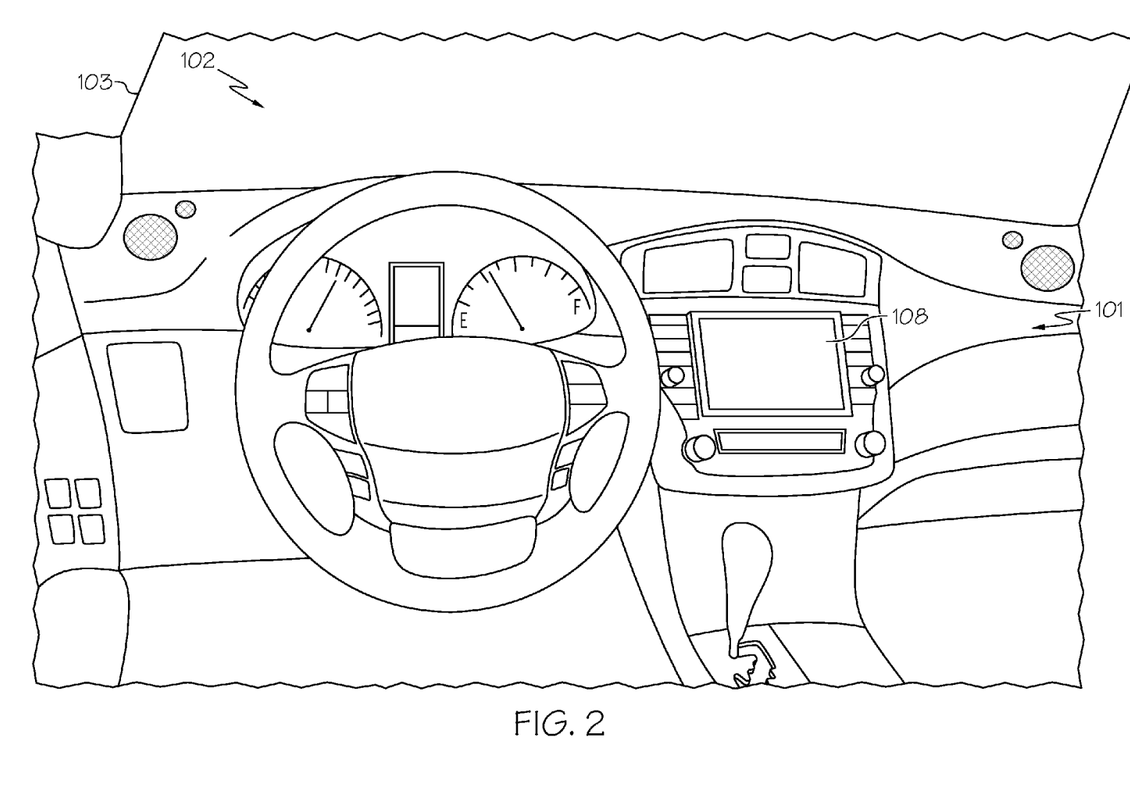
FIG. 2 depicts an interior of the ego-vehicle of FIG. 1 according to one or more embodiments shown and described herein.

Referring now to FIG. 2, the ego-vehicle 100 has an interior 102, a windshield 103, and a display 108. Though the display 108 is situated within a dashboard 101 of the ego-vehicle 100, it is noted that the display 108 may be at least one of a heads-up display, an instrument cluster display, a navigation display, and a display of a mobile device 145 (shown in FIG. 3).

Figure 3:
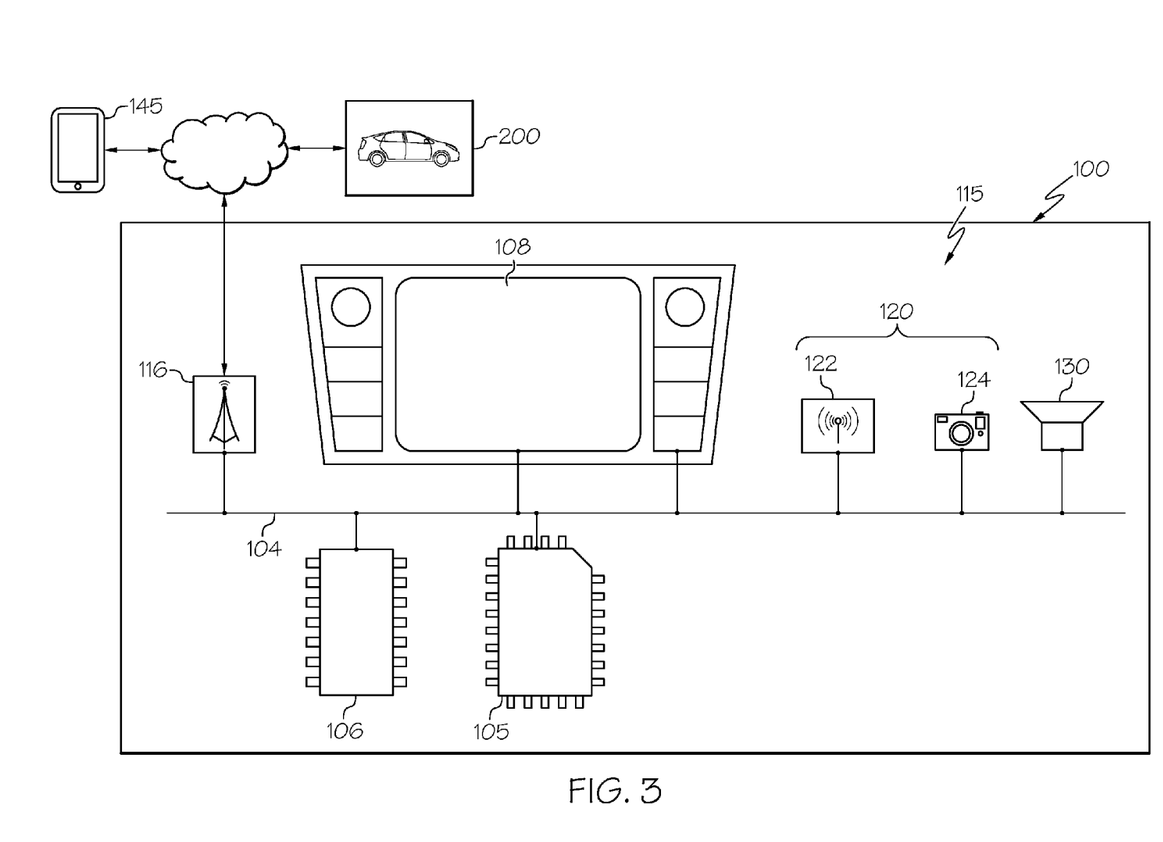
FIG. 3 depicts a communication path of the ego-vehicle of FIG. 1 according to one or more embodiments shown and described herein.

Referring to FIG. 3, the ego-vehicle 100 includes a system 115 for displaying a behavior of a target object that includes one or more processors 105. Each of the one or more processors 105 may be any device capable of executing machine readable instructions. Accordingly, each of the one or more processors 105 may be a controller, an integrated circuit, a microchip, a computer, or any other computing device. The one or more processors 105 are coupled to a communication path 104 that provides signal interconnectivity between various modules. Accordingly, the communication path 104 may communicatively couple any number of processors 105 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego-vehicle 100 further includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 105. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 106 may include a database that includes navigation information and/or map information. However, it should be understood that other embodiments may not include navigation information and/or map information. In such embodiments, the ego-vehicle 100 may display on a display 108 road parameters. As an example, and not a limitation, road parameters may include lane lines, on/off ramps, and barriers. Furthermore, the one or more memory modules 106 may include an image recognition database or algorithm to allow the ego-vehicle 100 to identify a target object type sensed within a vicinity of the ego-vehicle 100. This will be discussed further below.

Referring also to FIG. 2, the ego-vehicle 100 comprises the display 108 for providing visual output such as, for example, maps, navigation, entertainment, information, or a combination thereof. The display 108 is coupled to the communication path 104, as shown in FIG. 3. Accordingly, the communication path 104 communicatively couples the display 108 to other modules of the ego-vehicle 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display 108. Accordingly, the display 108 may receive mechanical input directly upon the optical output provided by the display 108. Additionally, it is noted that the display 108 can include at least one of the one or more processors 105 and the one or memory modules 106. As noted above, the display 108 could, in the alternative, be at least one of a heads-up display, an instrument cluster display, and a mobile device display. In some embodiments, the ego-vehicle 100 may have a plurality of displays. In such embodiments, the ego-vehicle 100 could also have a plurality of different types of displays. For example, and not as a limitation, the ego-vehicle 100 could have an in-dashboard display and a heads-up display for displaying information directly on the windshield 103 or window of the ego-vehicle 100.

In some embodiments, the ego-vehicle 100 comprises network interface hardware 116 for communicatively coupling the ego-vehicle 100 to a target object 200 such that data can be sent between the ego-vehicle 100 and target object 200. For instance, the ego-vehicle 100 and target object 200 may send and receive information relevant to speed, road conditions, oncoming obstacles, etc. In some embodiments, wherein the target object 200 is a vehicle, this is known as vehicle-to-vehicle communication. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. In another embodiment, network interface hardware 116 may include a Bluetooth send/receive module for sending and receiving Bluetooth communications to/from a mobile device 145. Some embodiments may not include the network interface hardware 116.

The ego-vehicle 100 may comprise one or more sensors 120 communicatively coupled to the one or more processors 105. The one or more sensors 120 may be used in conjunction with vehicle-to-vehicle communication or alone. The one or more sensors 120 include, but are not limited to, cameras, LiDAR, RADAR, and proximity sensors. In some embodiments, multiple types of sensors are used to provide a variety of information to the ego-vehicle 100.

For instance, FIG. 3 illustrates the ego-vehicle 100 utilizing a variety of sensors 120. A camera 124 may be coupled to the communication path 104 such that the communication path 104 communicatively couples the camera 124 to other modules of the ego-vehicle 100. The camera 124 may be any device having an array of sensing devices (e.g., pixels) capable of detecting radiation in an ultraviolet wavelength band, a visible light wavelength band, or an infrared wavelength band. The camera 124 may have any resolution. Some embodiments may not include the camera 124. Some embodiments may include multiple cameras. In operation, the camera 124 may be able to detect a target object 200 within a vicinity of the ego-vehicle 100. Further, the camera 124 may be able to determine one or more characteristics about the target object 200, such as, for example, the speed and direction of travel of the target object 200. In further embodiments, the camera 124 and/or the one or more processors 105, based on input from the camera 124, may be able to also determine the type of object the camera 124 is capturing through image recognition capabilities. For example, the camera 124 and/or the one or more processors 105 may be able to determine whether the target object 200 is another vehicle, a cyclist, a pedestrian, or an animal.

Still referring to FIG. 3, the ego-vehicle 100 may further include a second sensor 122 in addition to the camera 124. The second sensor 122 is coupled to the communication path 104 such that the communication path 104 communicatively couples the second sensor 122 to other modules of the ego-vehicle 100. The second sensor 122 may be any device capable of outputting a signal indicative of the speed, direction of travel, and the general proximity of the target object 200 to the ego-vehicle 100. In some embodiments, the second sensor 122 may include RADAR, LiDAR, vehicle-to-vehicle communication, or the like. As described above, any sensor or combinations of sensors 120 may be used to detect and monitor a target object 200.

In some embodiments, the ego-vehicle 100 may further comprise a speaker 130 coupled to the communication path 104 such that the communication path 104 communicatively couples the speaker 130 to other modules of the ego-vehicle 100. The speaker 130 transforms data signals received by the one or more processors 105 into audible mechanical vibrations. However, it should be understood that in other embodiments the ego-vehicle 100 may not include the speaker 130. In some embodiments, the speaker 130 may be configured to provide information to an occupant of the ego-vehicle 100 about the target object 200, such as, for example, an alarm, a vocal message, or the like indicative of behavior of the target object 200. For example, the speaker 130 may emit an alarm to alert the user as to unusual or concerning behavior by the target object 200. For example, in instances wherein the target object 200 is another vehicle, the speaker 130 may emit an alert if the one or more processors 105 determine that the target object 200 is swerving unpredictably on the road.

Still referring to FIG. 3, the one or more processors 105 may implement a method of monitoring and displaying the speed, position, and direction of travel of a target object 200 outside of the ego-vehicle 100 in a spatio-temporal fashion. As used herein, "spatio-temporal" refers to having both spatial and temporal qualities. In some embodiments, the method may be implemented as logic within the machine readable instructions stored in the one or more memory modules 106, that, when executed by the one or more processors 105, automatically provides ego-vehicle 100 function instruction. It is noted that, while the method is described as following a specific sequence, additional embodiments of the present disclosure are not limited to any particular sequence.

In operation, the one or more processors 105, through the one or more sensors 120, detect the presence of a target object 200 within a vicinity of the ego-vehicle 100. The vicinity of the ego-vehicle 100 refers generally to a space surrounding the ego-vehicle 100. As such, the vicinity of the ego-vehicle 100 may include at least up to a reliable sensing range of the one or more sensors 120. In some embodiments, the ego-vehicle 100 may only monitor target objects 200 surrounding the ego-vehicle 100 and/or within a predetermined range.

The ego-vehicle 100 may detect the target object 200 within the vicinity of the ego-vehicle 100 in a variety of ways. For instance, the one or more processors 105 may determine the presence of the target object 200 within the vicinity of the ego-vehicle 100 using the one or more sensors 120 as described herein. As such, the one or more processors 105 may detect the target object 200 by at least the following non-limiting examples: vehicle-to-vehicle communication, cameras, LiDAR, RADAR, and proximity sensors. Once the one or more processors 105 has detected the target object 200 within the vicinity of the ego-vehicle 100, the one or more processors 105 monitor the position, speed, and direction of travel of the target object 200 with the one or more sensors 120.

Figure 4:
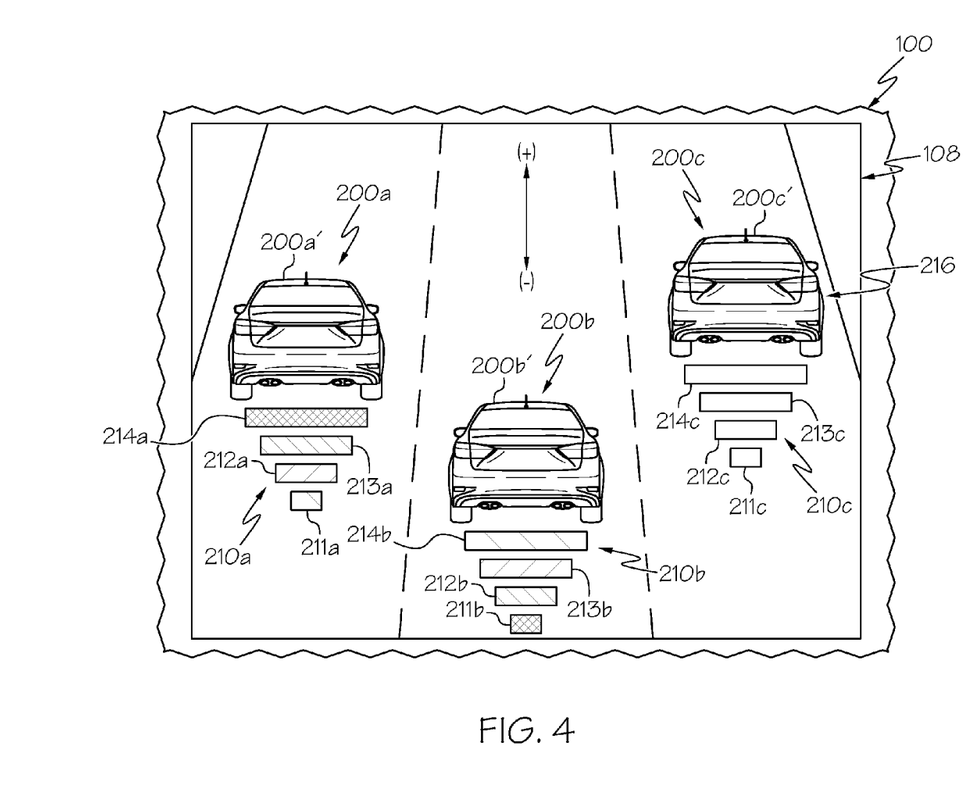
FIG. 4 depicts an exemplary embodiment of a display for monitoring a speed of a target object outside of the ego-vehicle of FIG. 1 according to one or more embodiments shown and described herein.

Referring now to FIGS. 3 and 4, the one or more processors 105 execute logic to display an object indicator 210 on the display 108. As an example, and not a limitation, FIG. 4 shows three target objects 200a, 200b, 200c displayed as graphical representations 200a', 200b', 200c' on the display 108. Each of the graphical representations 200a', 200b', 200c' has an object indicator 210a, 210b, 210c. It is noted that in embodiments incorporating a heads-up display, a graphical representation of a target object 200 need not be displayed on the display 108. Instead, the object indicator 210 may be associated with the target object 200 and shown directly trailing the target object 200 on a windshield 103 (shown in FIG. 2) or window of the ego-vehicle 100.

Figure 5:
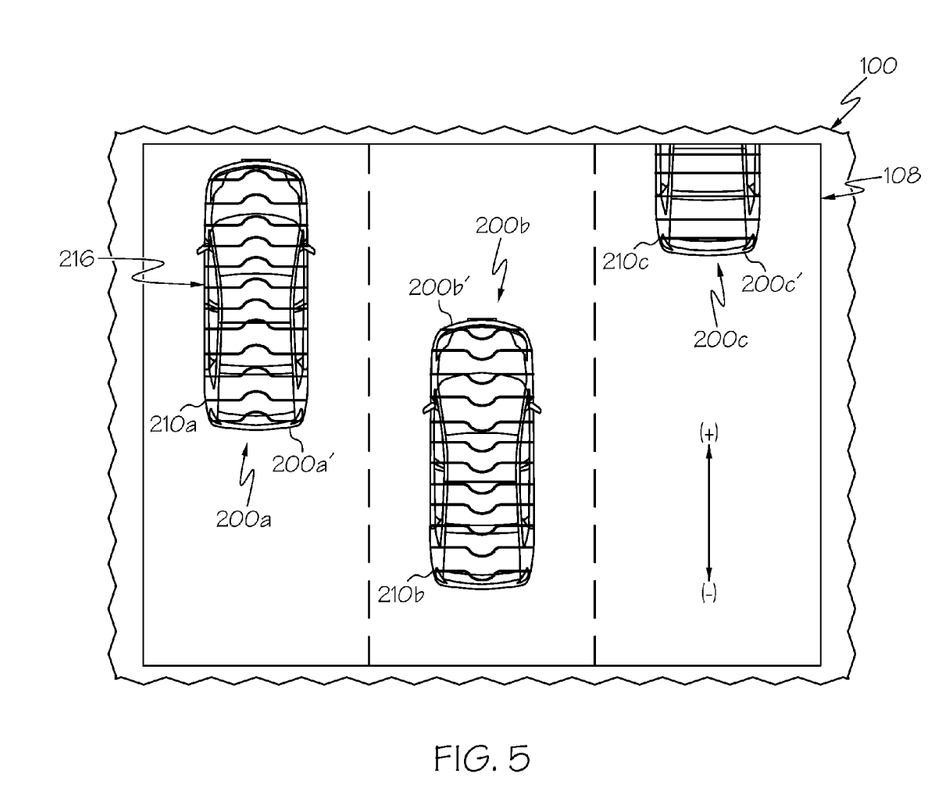
FIG. 5 depicts another exemplary embodiment of a display for monitoring a speed of a target object outside of the ego-vehicle of FIG. 1 according to one or more embodiments shown and described herein.
Figure 6:
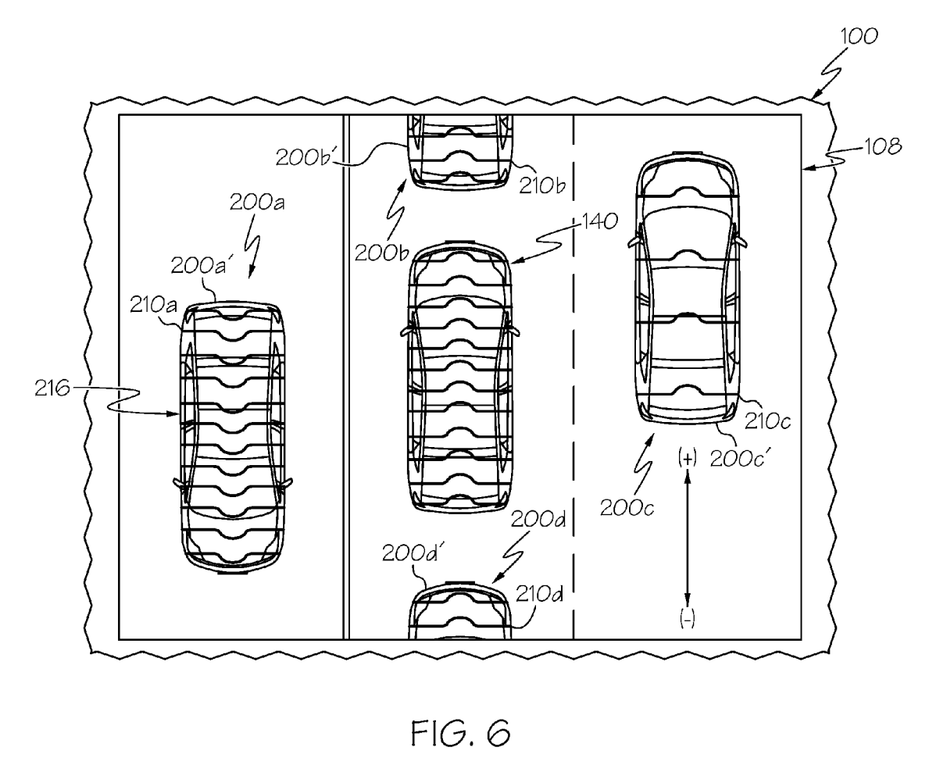
FIG. 6 depicts another exemplary embodiment of a display for monitoring a speed of a target object outside of the ego-vehicle of FIG. 1 according to one or more embodiments shown and described herein.

The object indicator 210 uses spatio-temporal patterning to provide a variety of information about the behavior of the target object 200 to a user. For example, the spatio-temporal patterning of the object indicator 210 may provide information relating to the speed, position, and direction of travel of the target object 200. The spatio-temporal patterning of the object indicator 210 displays the behavior of a target object 200 in both time and space. This means that the object indicator 210 concerns both where the target object 200 is relative to the ego-vehicle 100 and how the target object 200 is behaving at any given time. As such, the one or more processors 105 may adjust the spatio-temporal patterning of the object indicator 210 to correspond to the behavior of the target object 200. The spatio-temporal patterning of the object indicator 210 may take many forms to indicate the relative speed and direction of a target object 200. In some non limiting embodiments, the spatio-temporal patterning of the object indicator 210 includes at least one of a light pattern or waveform. For example, the one or more processors 105 may cause light to move along the object indicator 210 as a repeating waveform or pattern to indicate how the target object 200 is behaving at any given time. In some embodiments, and as shown in FIGS. 4 and 5, the one or more processors 105 execute logic such that the object indicator 210 may indicate the relative speed and direction of travel of the target object 200 to that of the ego-vehicle 100. In other embodiments, such as shown in FIG. 6, the object indicator 210 may indicate the absolute speed and direction of travel of the target object 200. Furthermore, the object indicator 210 may move across the display 108 in a way that corresponds to the movements of the target object 200.

Referring again to FIG. 4, the object indicators 210a, 210b, 210c are displayed by the one or more processors 105 such that the object indicators 210a, 210b, 210c trail the graphical representations 200a', 200b', 200c' of the target objects 200a, 200b, 200c by being associated therewith.

To better understand the spatio-temporal patterning of an example object indicator 210, reference will now be made specifically to object indicator 210a. The object indicator 210 trails either a graphical representation 200a' of the target object 200a or, as described above, the actual target object 200a on a heads up display. Though the object indicator 210 may take any shape suitable for presenting a spatio-temporal patterning corresponding to the movement of the target object 200, in this example, the spatio-temporal patterning of the object indicator 210a includes four horizontal bars 211a, 212a, 213a, 214a. Each of the horizontal bars 211a, 212a, 213a, 214a has a cross-hatching pattern. The cross hatching pattern is representative of the direction light travels through the bars 211a, 212a, 213a, 214a. As indicated, the cross-hatching in the present example is lightest in the first bar 211a. The amount of cross-hatching increases over the second and third bars 212a, 213a. The fourth bar 214a has the most cross-hatching. This patterning indicates that light travels through the four bars 211a, 212a, 213a, 214a, starting at the first bar 211a and ending at the fourth bar 214a, wherein the pattern may repeat itself. This pattern would be indicative of the target object 200a traveling in the forward (+) direction relative to the ego-vehicle 100 and at a faster speed relative to the speed of the ego-vehicle 100. The speed at which light moves through the four bars 211a, 212a, 213a, 214a of the object indicator 210a may be proportional to the speed of the target object 200a relative to the speed of the ego-vehicle 100. For example, if the target object 210a is traveling much faster relative to the speed of the ego-vehicle 100, the light may travel through the object indicator 210a quickly. If, on the other hand, the target object 200a is traveling only slightly faster relative to the speed of the ego-vehicle 100, the light may travel through the object indicator 210a slowly.

Referring now to object indicator 210b in FIG. 4, the spatio-temporal patterning of the object indicator 210b may also include four horizontal bars 211b, 212b, 213b, 214b. Again, each of the four bars 211b, 212b, 213b, 214b include a cross hatching pattern to represent the direction that light may travel through the object indicator 210b. In this example, the cross-hatching pattern is heaviest in the first bar 211b, lightens through the second and third bars 212b, 213b, and is lightest in the fourth bar 214b. Therefore, the light pattern is shown to travel through the four bars 211b, 212b, 213b, 214b starting at the fourth bar 214b and ending at the first bar 211b, wherein the pattern may then repeat itself. This spatio-temporal patterning would be indicative of the target object 200b traveling in the opposite (−) direction relative to the ego-vehicle 100. Because the object indicator 210b is presenting the speed and direction of travel of the target object 200b in relative terms, the target object 200b may either be slowing down or actually traveling in the opposite direction of the ego-vehicle 100. As discussed above, the speed at which light moves through the four bars 211b, 212b, 213b, 214b may be proportional to the speed of the target object 200b relative to the speed of the ego-vehicle 100. For example, if the target object 200b is traveling at a much slower speed than the ego-vehicle 100, the light pattern would travel quickly through the object indicator 210b. If, on the other hand, the target object 200b is only traveling somewhat slower than the ego-vehicle 100, the light pattern may travel slowly through the object indicator 200b.

Based on the above it should be understood that, in at least some embodiments, when there is a great difference of speed between the target object 200 and the ego-vehicle 100, the spatio-temporal patterning may be travel faster through the object indicator 210. However, if there is only a small difference in speed between the target object 200 and the ego-vehicle 100, the spatio-temporal patterning may travel slower through the object indicator 200.

Referring now to object indicator 210c of FIG. 4, it is apparent that no cross-hatching pattern is shown in the four bars 211c, 212c, 213c, 214c. In this example, the absence of cross-hatching is meant to represent that the target object 200c is not moving relative to the ego-vehicle 100. This may indicate that the target object 200c is moving at the same speed as the ego-vehicle 100 and in the same direction. In other embodiments, the target object 200c may instead display a static light pattern. For example, and not as a limitation, all four bars 211c, 212c, 213c, 214c of the object indicator 200c may be lit. It is also contemplated that an object indicator 210 may not be displayed at all if there is no speed difference between the ego-vehicle 100 and the target object 200.

Though the above example the spatio-temporal patterning of the object indicators 210a, 210b, 210c are described in terms of having four bars, it is contemplated that the spatio-temporal patterning of the object indicator 210 could have a greater or fewer number of bars, or could take on a completely different form. In yet further embodiments, the spatio-temporal patterning of the object indicator 210 may have a dynamic set of bars wherein the number of bars change or lengthen in a way that corresponds to the behavior of the target object 200. For example, and not as a limitation, if a target object 200 is speeding away from the ego-vehicle 100 at a very fast rate, the number of bars of the spatio-temporal patterning of the object indicator 210 may extend to include more bars to further indicate how much faster the target object 200 is traveling relative to the ego-vehicle 100.

It is noted that the spatio-temporal patterning of an object indicator 210 may also be associated with specific colors. When the one or more processors 105 display an object indicator 210, the one or more processors 105 may execute logic to assign and display the spatio-temporal patterning of the object indicator 210 with a certain color waveform or light pattern. For example, and not as a limitation, if the one or more processors 105 detect that the target object 200 is quickly slowing down, such that the ego-vehicle 100 is quickly approaching the target object 200, the spatio-temporal patterning of the object indicator 210 may be displayed in red. If, on the other hand, the target object 200 is slowly pulling away from the ego-vehicle 100, the spatio-temporal patterning of the object indicator 210 may be displayed in blue.

Referring now to FIG. 5, FIG. 5 depicts another example embodiment of the display 108, wherein a graphical representation of a target object 200 is displayed on the display 108. In this embodiment, the spatio-temporal patterning of the object indicator 210 is a waveform superimposed on the graphical representation of the target object 200. It should be understood that, though not shown, the waveform may move in a similar way to the light pattern discussed above to provide spatio-temporal information of the target object 200. This embodiment is, again, directed to providing the speed and direction of travel of the target object 200 relative to the speed and direction of travel of the ego-vehicle 100. Though the graphical representations of a target object 200 in the current embodiments are in the shape of vehicles, it is contemplated that the graphical representation of a target object 200 in other embodiments may be a different symbol that may or may not correspond to the actual form of the target object 200.

Target object 200a is represented by graphical representation 200a' and has an object indicator 210a. The spatio-temporal patterning of the object indicator 210a is a forward flowing waveform indicated by the forward facing bump within the wave pattern. It is noted that the bump is present simply to illustrate the direction of flow, and may or may not be present in other embodiments. The forward flowing waveform indicates that the target object 200a is traveling in the forward (+) direction relative to the ego-vehicle 100 and at a faster speed relative to the speed of the ego-vehicle 100. In the illustrative example, the frequency of the waveform is represented by the number of waves along the length of the graphical representation 200a'. The frequency of the waveform is proportional to the speed of the target object 200 relative to the speed of the ego-vehicle 100. Thus, the greater the frequency of the waveform, the greater the difference in speed between the ego-vehicle 100 and the target object 200a. In this case, the frequency of the waveform of object indicator 210a may indicate that the target object 200a is traveling at a much faster speed relative to the ego-vehicle 100.

Referring now to the graphical representation 200b' of target object 200b, the target object 200b has an object indicator 210b. The spatio-temporal patterning of the object indicator 210b is a rearward flowing waveform indicated by the rearward facing bump. The rearward flowing waveform may indicate that the target object 200b is traveling in the opposite (−) direction relative to the ego-vehicle 100. The frequency of the waveform of the object indicator 210b is roughly equal to the frequency of the waveform of object indicator 210a. Thus, it may be deduced that the target object 200b is either quickly decelerating, i.e. slamming on the breaks, or is actually traveling toward the ego-vehicle 100.

Referring now to graphical representation 200c' of target object 200c, target object 200c has an object indicator 210c. The spatio-temporal patterning of the object indicator 210c has stagnant waveform, or in some embodiments no waveform. Because the embodiment shown in FIG. 5 is directed to displaying the speed of the target object 200c relative to the speed of the ego-vehicle 100, no waveform or a stagnant waveform may be indicative of the target object 200c moving at the same speed of the ego-vehicle 100 and in the same direction as the ego-vehicle 100.

FIG. 6 depicts yet another embodiment of the display 108, wherein a graphical representation of a target object 200 is displayed on the display 108. In this embodiment, the spatio-temporal patterning of the object indicator 210 is again a waveform superimposed on the graphical representation of the target object 200. However, this embodiment is directed toward providing the absolute speed and direction of travel as opposed to the relative speed and direction of travel as provided in the examples above. Absolute speed refers to the actual speed an object is traveling. For example, if the ego-vehicle 100 is traveling at 60 mph and the target object 200 is traveling at 65 mph in the same direction as the ego-vehicle 100, the object indicator 210 will indicate that the speed of the target object 200 is 65 mph. In contrast, if the speed of the target object 200 is presented as relative to the speed of the ego-vehicle 100, the object indicator 210 would only indicate the speed of the target object 200 as being 5 mph.

To aid in expressing the absolute speed and direction of travel of the target object 200, an ego-vehicle indicator 140 of the ego-vehicle 100 may also be displayed on the display 108 to provide context. The ego-vehicle indicator 140 may depict a spatio-temporal patterning that includes a waveform superimposed over a graphical representation of the ego-vehicle 100. In the example shown, the spatio-temporal patterning of the ego-vehicle indicator 140 is a forward flowing waveform. The forward flowing waveform is indicative of the ego-vehicle 100 traveling in the forward (+) direction. The frequency of the waveform is proportional to the absolute speed at which the ego-vehicle 100 is traveling.

Referring now to the graphical representations 200b', 200c', and 200d' of the target objects 200b, 200c, and 200d. The spatio-temporal patterning of the object indicators 210b, 210c, 210d each depict a forward flowing waveform to indicate that the target objects 200b, 200c, 200d are traveling in the forward (+) direction. The frequency of the various waveforms are proportional to the absolute speeds at which the target objects 200b, 200c, 200d are traveling. In the current example, it is apparent that target object 200c is shown to be traveling at a slower speed than the ego-vehicle 100 because the frequency of the waveform of the object indicator 210c is less than the frequency of the waveform of the ego-vehicle indicator 140.

It is noted that in some embodiments, and as indicated in FIG. 6, the one or more processors 105 monitor and display not only preceding target objects 200a, 200b, 200c, but also target objects 200 following the ego-vehicle 100 (see target object 200d). Furthermore, in some embodiments, the one or more processors 105 may also monitor and display target objects 200 traveling in the opposite direction of the ego-vehicle 100. For example, target object 200a has an object indicator 210a. As shown, the spatio-temporal patterning of the object indicator 210a has a waveform oscillating in a direction opposite the ego-vehicle 100. Thus, target object 200a is traveling in a direction opposite the direction of travel of the ego-vehicle 100.

Figure 7:
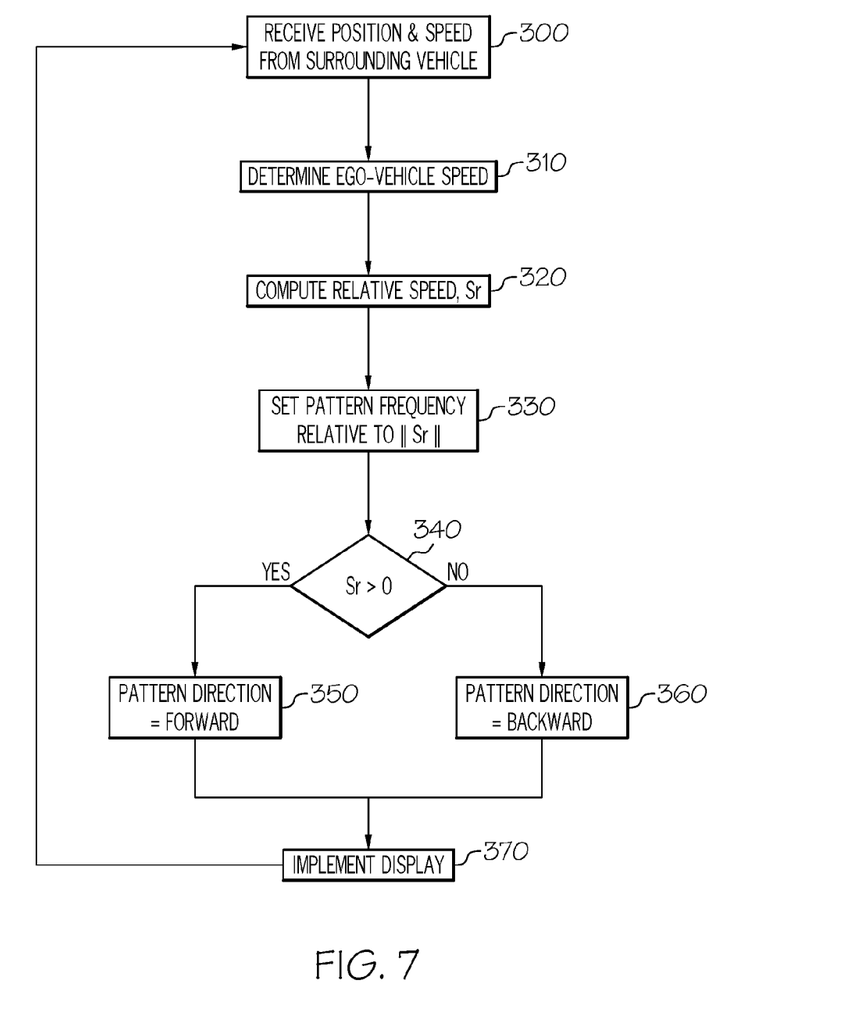
FIG. 7 illustrates a flow diagram for monitoring a behavior of target object using vehicle-to-vehicle communication according to one or more embodiments shown and described herein.

Referring now to FIG. 7, flow diagram illustrates an example method for monitoring the behavior of a target object 200. As described herein, the one or more sensors may include vehicle-to-vehicle communication, wherein the ego-vehicle 100 is configured to communicate with other vehicles (target objects 200) within a vicinity of the ego-vehicle 100. At block 300 the ego-vehicle 100 receives position and speed from surrounding vehicles. As described herein, the one or more processors 105 may execute logic stored on one or more memory modules 106 to cause the ego-vehicle 100 to communicate over the network interface hardware 116 with the one or more target objects 200 (e.g., other vehicles). At block 310, based on the communication between the target object 200 and the ego-vehicle, the ego-vehicle speed may be determined. At block 320, the ego-vehicle may then compute, by executing logic with the one or more processors 105, the relative speed, $S_r$, of the target object 200. At block 330, based on the calculated relative speed, $S_r$, the one or more processors 105 may execute logic to set the pattern frequency of the object indicators 210, as described herein. In embodiments wherein the relative speed of the target object 200 is determined, at block 340, the one or more processors 105 execute logic to determine if the relative speed, $S_r$, of the target object 200 is greater than zero. If so, at block 350, the pattern of the object indicator 210 is set to flow in a forward direction. If the target object 200 has a relative speed, $S_r$, of less than zero, at block 360, the pattern of the object indicator 210 is set to flow in a rearward direction. At block 370, the display 108, as described herein, is implemented to display the object indicators and/or graphical representations 200' of the target objects 200 on the display 108. As described herein, the ego-vehicle 100 can continue to monitor the position and relative speed, $S_r$, of the target object 200 at least as long as the target object 200 is within the vicinity of the ego-vehicle 100.

It is noted that though reference is made to forward (+) and opposite (−) directions, the present specification may also sense target objects 200 traveling in any direction within a vicinity of the ego-vehicle 100.

In each of the embodiments depicted in FIGS. 4-6, the object indicator 210 is shown on the display 108 at a position corresponding to an actual position of the target object 200 relative to the ego-vehicle 100. Further, in embodiments comprising object recognition features as described herein, the object indicator 210 or graphical representation of the target object 200 may have a shape 216 indicative of the type of target object 200 sensed. Though the current figures show object indicators 210 in the shape of vehicles, it is contemplated that an object indicator 210 could also appear as other shapes. For example, and not as a limitation, an object indicator 210 may also be in the shape of a pedestrian or cyclist based on the type of object sensed by the one or more sensors 120.

It is further noted, that embodiments of the ego-vehicle 100 including map, GPS, or image recognition capabilities may also be able to identify road parameters and display virtual road parameters on the display 108. As described above, such road parameters may include, without limitation, lane lines, on/off ramps, and barriers. In such embodiments, the object indicator 210 may be displayed in a virtual lane corresponding to the actual lane the target object 200 is in.

It should be understood that embodiments described herein provide ego-vehicles and methods for displaying a behavior of a target object in a spatio-temporal manner. As such, embodiments described herein allow a user of a vehicle an additional dimension for monitoring the motion of objects outside of the ego-vehicle. This is particularly useful for drivers of autonomous vehicles who may only be checking in periodically with road conditions and, as such, need to be able to quickly and efficiently understand the motions of objects outside of their vehicle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An ego-vehicle for displaying a behavior of a target object in a spatio-temporal manner, the ego-vehicle comprising:
   one or more processors;
   one or more memory modules communicatively coupled to the one or more processors;
   a display communicatively coupled to the one or more processors;
   one or more sensors communicatively coupled to the one or more processors; and
   machine readable instructions stored in the one or more memory modules that cause the one or more processors to, based on a signal from the one or more sensors, display on the display an object indicator associated with a position of the target object relative to the ego-vehicle, wherein:
      the object indicator depicts a spatio-temporal patterning indicating the behavior of the target object; and
      the spatio-temporal patterning of the object indicator comprises at least one of a light pattern and waveform, the at least one of the light pattern and waveform having a frequency proportional to a speed of the target object.

2. The ego-vehicle of claim 1, wherein the machine readable instructions cause the one or more processors to adjust the spatio-temporal patterning of the object indicator in both time and space to indicate the behavior of the target object at any given time.

3. The ego-vehicle of claim 1, wherein:
   the spatio-temporal patterning of the object indicator further indicates a direction the target object is traveling; and
   the machine readable instructions further cause the one or more processors to move the object indicator across the display to correspond with a movement of the target object within a vicinity of the ego-vehicle.

4. The ego-vehicle of claim 1, wherein the spatio-temporal patterning of the object indicator indicates the speed and direction of travel of the target object relative to a speed and direction of travel of the ego-vehicle.

5. The ego-vehicle of claim 1, wherein the spatio-temporal patterning of the object indicator indicates an absolute speed and direction of travel of the target object.

6. The ego-vehicle of claim 5, wherein:
   the machine readable instructions further cause the one or more processors to display an ego-vehicle indicator on the display, wherein the ego-vehicle indicator depicts a spatio-temporal patterning indicating at least the absolute speed of the ego-vehicle; and the object indicator is displayed adjacent to the ego-vehicle indicator at a position on the display corresponding to the position of the target object within a vicinity of the ego-vehicle.

7. The ego-vehicle of claim 6, wherein:
the spatio-temporal patterning of the ego-vehicle indicator comprises at least one of a light pattern and waveform, the at least one of the light pattern and waveform having a frequency proportional to the absolute speed of the ego-vehicle and a direction of flow indicative of a direction of travel of the ego-vehicle; and
the at least one of the light pattern and waveform of the spatio-temporal patterning of the object indicator has a frequency proportional to the absolute speed of the target object and a direction of flow indicative of the direction of travel of the target object.

8. The ego-vehicle of claim 1, wherein the light pattern and waveform of the spatio-temporal patterning of the object indicator has a direction of flow indicative of a direction of travel of the target object relative to a direction of travel of the ego-vehicle.

9. The ego-vehicle of claim 1, wherein the frequency of the spatio-temporal patterning of the object indicator adjusts to correspond to changes in the speed of the target object.

10. The ego-vehicle of claim 1, wherein the machine readable instructions further cause the one or more processors to identify a target object type, wherein the object indicator indicates the target object type.

11. The ego-vehicle of claim 1, wherein the ego-vehicle is an autonomous vehicle.

12. The ego-vehicle of claim 1, wherein the machine readable instructions further cause the one or more processors to:
identify road parameters, wherein the road parameters include at least a lane of a road; and
display the road parameters on the display, wherein the object indicator is displayed in the lane corresponding to the lane the target object is in.

13. The ego-vehicle of claim 1, wherein the display is at least one of a heads-up display, an instrument cluster display, a navigation display, and a mobile device display.

14. A system for displaying a behavior of a target object in a spatio-temporal manner relative to the system, the system comprising:
one or more processors;
one or more memory modules communicatively coupled to the one or more processors;
a display communicatively coupled to the one or more processors;
one or more sensors communicatively coupled to the one or more processors; and
machine readable instructions stored in the one or more memory modules that cause the one or more processors to, based on a signal from the one or more sensors, display on the display an object indicator associated with a position of the target object relative to the system, wherein:
the object indicator depicts a spatio-temporal patterning indicating the behavior of the target object relative to the system; and
the spatio-temporal patterning of the object indicator comprises at least one of a light pattern and waveform, the at least one of the light pattern and waveform having a frequency proportional to a speed of the target object.

15. The system of claim 14, wherein:
the at least one of the light pattern and waveform of the spatio-temporal patterning of the object indicator has a direction of flow indicative of a direction of travel of the target object relative to a direction of travel of the system; and
the frequency of the spatio-temporal patterning adjusts to correspond to the changes in the speed and the direction of travel of the target object relative to the system.

16. The system of claim 14, wherein the one or more sensors include at least one of a camera, LiDAR, RADAR, and vehicle-to-vehicle communication.

17. The system of claim 14, wherein the machine readable instructions further cause the one or more processors to move the object indicator across the display to correspond with a movement of the target object within a vicinity of the system.

18. A method of displaying a behavior of a target object in a spatio-temporal manner relative to an ego-vehicle comprising:
detecting, with one or more sensors, the target object in a vicinity of the ego-vehicle;
monitoring a speed, direction of travel, and position of the target object relative to the ego-vehicle;
displaying, with one or more processors, an object indicator associated with the position of the target object relative to the ego-vehicle on a display, wherein:
the object indicator depicts a spatio-temporal patterning indicating the behavior of the target object; and
the spatio-temporal patterning of the object indicator comprises at least one of a light pattern and waveform, the at least one of the light pattern and waveform having a frequency proportional to a speed of the target object; and
adjusting the spatio-temporal patterning of the object indicator on the display to correspond with the behavior of the target object within the vicinity of the ego-vehicle.

19. The method of claim 18, wherein:
the at least one of the light pattern and waveform of the spatio-temporal patterning of the object indicator has a direction of flow indicative of a direction of travel of the target object relative to a direction of travel of the ego-vehicle.

20. The method of claim 18, further comprising:
identifying road parameters, wherein road parameters include at least a lane of a road; and
displaying virtual road parameters on the display, wherein:
the virtual road parameters include at least a virtual lane corresponding to the lane of the road; and
the object indicator of the target object is displayed in the virtual lane corresponding to the lane the target object is in.

* * * * *